(12) United States Patent
Wang et al.

(10) Patent No.: US 6,437,681 B1
(45) Date of Patent: Aug. 20, 2002

(54) STRUCTURE AND FABRICATION PROCESS FOR AN IMPROVED HIGH TEMPERATURE SENSOR

(75) Inventors: Chung Hsiung Wang, Hsin Chu (TW); Al Salman, Neenah, WI (US); Yue-Lang Chen, Kaohsiung (TW)

(73) Assignee: Cyntec Company, Hsinchu (TW)

( * ) Notice: Subject to any disclaimer, the term of this patent is extended or adjusted under 35 U.S.C. 154(b) by 0 days.

(21) Appl. No.: 09/698,695

(22) Filed: Oct. 27, 2000

Related U.S. Application Data

(60) Provisional application No. 60/161,784, filed on Oct. 27, 1999.

(51) Int. Cl.[7] ................................................. H01L 3/04
(52) U.S. Cl. ........................................... 338/25; 338/28
(58) Field of Search ...................................... 338/25, 28

(56) References Cited

U.S. PATENT DOCUMENTS

| | | | | |
|---|---|---|---|---|
| 3,244,556 A | * | 4/1966 | Mytych | 338/308 |
| 4,050,052 A | * | 9/1977 | Reichelt et al. | 338/308 |
| 4,375,056 A | * | 2/1983 | Baxter et al. | 338/25 |
| 4,649,368 A | * | 3/1987 | Best | 338/283 |
| 4,715,117 A | * | 12/1987 | Enomoto | 29/851 |
| 4,720,394 A | * | 1/1988 | Kojima et al. | 427/96 |
| 4,791,398 A | * | 12/1988 | Sittler et al. | 338/25 |
| 4,805,296 A | * | 2/1989 | Jinda et al. | 29/620 |

* cited by examiner

*Primary Examiner*—Karl D. Easthom
(74) *Attorney, Agent, or Firm*—Bo-In Lin

(57) ABSTRACT

The present invention discloses a temperature sensor. The temperature sensor includes an aluminum oxide substrate and a thin-film resistor having a specific temperature coefficient of resistance (TCR) disposed over the substrate. The temperature sensor further includes an aluminum oxide stress-relief layer covering the thin film resistor. The temperature sensor further includes a passivation layer covering the aluminum oxide stress-relief layer. The aluminum oxide stress-relief layer further has at least one resistor-trimming trench formed by removing a portion of the aluminum oxide stress-relief layer and thin-film resistor therefrom and the resistor-trimming trench is filled with a material of the passivation layer. In a preferred embodiment, the temperature sensor further includes a set of dummy pads for resistance-trimming measurement disconnected from the thin film resistor disposed on the substrate near the thin film resistor covered by the passivation layer. In another preferred embodiment, the temperature sensor further includes a set of sensor bonding pads disposed on the substrate electrically connected to the thin film resistor covered by the passivation layer. And, the temperature sensor further includes a set of platinum chip-leads bonded to the sensor bonding pads for temperature measurement connections.

14 Claims, 3 Drawing Sheets

STRUCTURE AND FABRICATION PROCESS FOR AN IMPROVED HIGH TEMPERATURE SENSOR

This Application claims a Priority Filing Date of Oct. 27, 1999 benefited from a previously filed Provisional Application No. 60/161,784 filed by same inventors of this Formal Application.

BACKGROUND OF THE INVENTION

1. Field of the Invention

This invention relates generally to the structure and fabrication process of a temperature sensor. More particularly, this invention relates to the materials employed for forming the sensor and the passivation layers, special structural features and fabrication process for producing improved temperature sensor that are more reliable for long term high temperature operation.

2. Description of the Prior Art

A temperature-sensing device manufactured by forming a thin metallic film on a substrate often presents special technical difficulties and application limitations not yet resolved by those of ordinary skill in the art. Specifically, the range of temperature measurement is limited due to the problems of device integrity when the sensors are employed for higher temperature measurement above 700° C. (Celsius). As the sensor experiences temperature cycles ranging between 700° C. and the room temperature, the differences in the temperature expansion coefficients (TEC) between different layers generate stress that gradually damages the layer integrity and the sensing element and bonding pads of the sensor. The mechanical and electrical connections are degraded due to the weakened layer structure. Furthermore, as the mechanical structure and the layer integrity are adversely affected through temperature cycles, the precision of temperature measurement is also degraded. Therefore, it is difficult to provide a highly reliable sensor when a thin film resistive-temperature detector (RTD) is applied to measure temperature above 700° C. In addition to these difficulties, in order to achieve higher level of sensing precision and sensitivity, structural integrity of the sensing device is often compromised. This is often caused by the fact that as the structural integrity are improved by more securely attaching the sensing element to the supporting substrate. The materials and structural elements employed often adversely interfere with the measurements performed by the sensing element thus adding imprecision or lowering the measurement sensitivity.

In order to provide a highly sensitive temperature sensor, it is desirable that the temperature-sensing element is as thermally insulated as possible from the supporting substrate. Therefore, a substrate of very low thermal conductivity is suitable for such applications. However, a typical thermal insulating material, e.g., a glass substrate, often produces a difficulty that the sensing element, e.g., a platinum thin film cannot be securely attached to the surface of such substrate. Problems with structural integrity due to weak adhesion between the bonding pads and the substrate also cause a major difficulty in sensor reliability. Loose connection of the sensor elements from the measuring electrodes connected thereto or peeling off of the platinum thin film from the supporting substrate are often potential problems which must be taken into consideration when design a sensitive temperature sensor applying thin film technology. Particularly, poor contact can cause increase in resistance and generates errors in temperature measurement.

Many prior art attempts are applied to resolve this difficulty. jinda et al. disclose in U.S. Pat. No. 4,805,296 entitled "Method of Manufacturing Platinum Resistance Thermometer" (issued on Feb. 21, 1989) a method of manufacturing a resistance thermometer by preparing a support substrate and forming a platinum film serving as a temperature measuring element. A sputtering process containing a predetermined amount of oxygen gas is applied to form the platinum. The resistance thermometer may further include an aluminum oxide film serving as a stabilizing layer to improve the stability and reproducibility of the sensor characteristics, namely the platinum layer. The aluminum layer is particularly useful for stabilizing the resistance temperature characteristics during a high temperature treatment of the resistor thermometer. FIG. 1 is included from Jinda's patent as a background structure for understanding the technology involved in this invention. An aluminum oxide layer 2 covers a silicon substrate 1 for supporting a platinum film 3 thereon. The platinum film is then patterned and provided with lead wires 5 for bonding to the opposite ends of the patterned platinum film. Jinda et al. employs an inexpensive glass as substrate and applies the aluminum oxide layer to provide adhesion for the platinum film to attach to the substrate and heat resistance to sustain the heat treatment. Adding the aluminum oxide film however does not provide a complete solution to the difficulty that the platinum film may still peel off from the glass substrate during operation of the sensor. The platinum film does not securely adhere to the substrate because there is significant difference in temperature expansion coefficients (TEC) between these layers. The structural integrity is still a problem for a high temperature TCR type of device especially when thin film technology is applied to make miniaturized devices for high temperature measurement.

Similar device structures are disclosed in many other patents. Reichelt et al. disclosed in U.S. Pat. No. 4,050,052, entitled "Electrical Temperature Measuring Resistor Structure Particularly for Resistance Thermometers" (issued Sep. 20, 1977) by forming the platinum film on a layer which has a temperature coefficient of expansion matching the platinum layer. The expansion layer disclosed is an aluminum oxide layer. Frank et al. disclosed in U.S. Pat. No. 4,129,848, entitled "Platinum Film Resistor Device" (issued Dec. 12, 1978) by sputtering the platinum film on a quartz and etch the film and the quartz to define the conducting paths of the resistor device. Furubayashi et al. disclosed in U.S. Pat. No. 4,649,365, entitled "Platinum Resistor for the Measurement of Temperature" (issued Mar. 10, 1987) by forming the platinum film on a silicon substrate overlaid with an aluminum oxide film. Sittler et al. disclosed in U.S. Pat. No. 4,791,398, entitled "The Film Platinum Resistance Thermometer with High Temperature fusion Barrier" (issued Dec. 13, 1988) by forming the platinum film on a silicon substrate overlaid with an barrier layer which is preferably a titanium oxide layer. All these devices, with similar structure as that of Jinda et al., are still limited by the same difficulty that the device structure is subject to integrity degradation for high temperature measurement due to TEC mismatches between layers particularly between that of the platinum film and the silicon substrate.

Therefore, a need still exists in the art of design and manufacture of thin film TCR type of improved devices for high temperature measurement with the sensor undergoing great range of temperature cycles. It is required that the novel and improved structure is able to resolve the difficulties generated by the weak structure configuration of conventional sensors. Additionally, this improved device is required for high precision temperature measurements where the sensing elements are constantly subject to great ranges of temperature cycles. The improved sensor is to provide assurance of high degree of structural integrity for long term high temperature measurements. It is also desirable that the structure integrity can be improved without sacrificing the measurement sensitivity whereby implementation of the TCR types of sensing device can be broadly incorporated in various modem high precision, high-speed applications.

SUMMARY OF THE PRESENT INVENTION

It is therefore an object of the present invention to provide a new layer structure and manufacture method for manufacturing a reliable high temperature TCR thin film sensor such that aforementioned difficulties and limitations encountered in the prior art can be overcome.

Specifically, it is an object of the present invention to provide a new layer structure and manufacture method for providing a reliable and accurate thin film RTD chip sensor that can sustain long-term high temperature operations without degradation of structure integrity. The TCR film is deposited onto a pure aluminum oxide substrate. Then, the TCR film is protected by multiple-layer multiple annealing aluminum oxide layers. The residual mechanical stresses between the protective aluminum layers and the resistive sensing thin film that could be induced by temperature cycles are completely relieved by multiple annealing processes. Therefore, the TCR resistive can provide long term stable and precise temperature measurement with being unduly affected by the residual stresses induced by temperature cycles.

Another object of the present invention is to provide a new structural configuration and manufacture method for providing a reliable and accurate thin film RTD chip sensor that can sustain long-term high temperature operations. The TCR film trimming is performed after relief operation of the residual stress between the TCR thin film and the multiple-layer multiple-annealing protective layer is completed. Unlike the conventional RTD chip, in this invention, the resistive film trimming is performed with the resistive film covered under the multiple-layer multiple-annealing protective film. And for the purpose of resistive film trimming, temporary resistance measuring pads are formed only for trimming measurement.

Briefly, in a preferred embodiment, the present invention includes a temperature sensor. The temperature sensor includes an aluminum oxide substrate and a thin-film resistor having a specific temperature coefficient of resistance (TCR) disposed over the substrate. The temperature sensor further includes an aluminum oxide stress-relief layer covering the thin film resistor. The temperature sensor further includes a passivation layer covering the aluminum oxide stress-relief layer wherein the aluminum oxide stress-relief layer further having at least one resistor-trimming trench formed by removing a portion of the aluminum oxide stress-relief layer and thin-film resistor therefrom and the resistor-trimming trench is filled with a material of the passiviation layer. In a preferred embodiment, the temperature sensor further includes a set of dummy pads for resistance-trimming measurement disconnected from the thin film resistor disposed on the substrate near the thin film resistor covered by the passivation layer. In another preferred embodiment, the temperature sensor further includes a set of sensor bonding pads disposed on the substrate electrically connected to the thin film resistor covered by the passivation layer. And, the temperature sensor further includes a set of platinum chip-leads bonded to the sensor bonding pads for temperature measurement connections.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
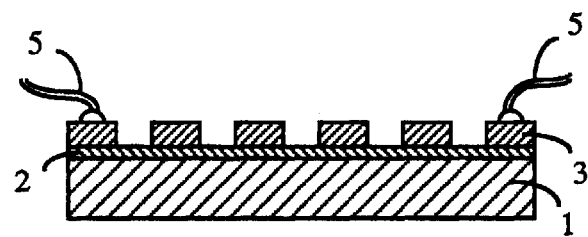
FIG. 1 is a cross sectional view showing the structure of a thin film temperature sensor according to an invention disclosed in an prior art patent.
Figure 2A:
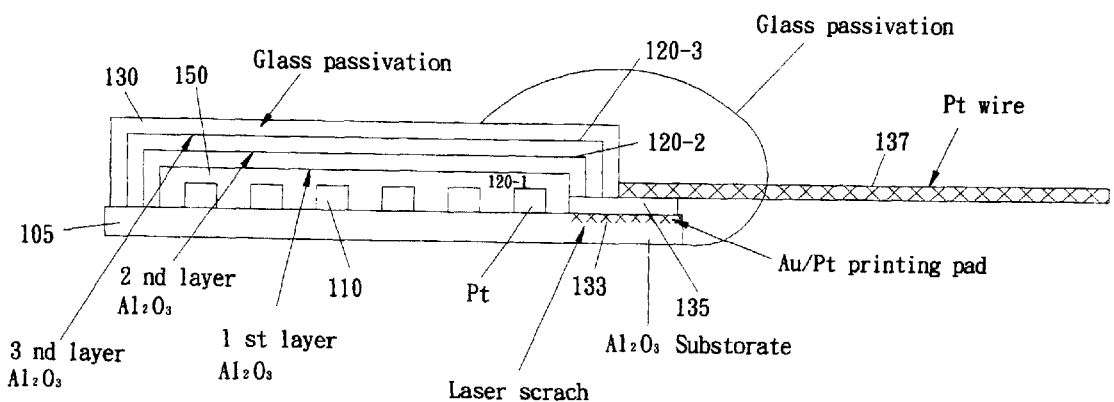
FIGS. 2A and 2B are a cross sectional view and a top view respectively of a resistive temperature detector (RTD) chip of the present invention.

FIG. 2A is a side cross sectional view of a multiple-deposition multiple-annealing thin film RTD chip of this invention for high temperature measurement. This resistance-temperature detecting (RTD) chip 100 is supported on a pure aluminum substrate 105. A plurality of thin film resistive element with certain resistance-temperature coefficient, e.g., platinum thin film sensing element, 110 are formed on the top surface of the substrate 105. The thin film RTD sensing elements 110 are covered and protected by a protective stress-relief layer 120. The protective stress-relief layer 120 comprises multiple-deposition multiple-annealing stress-relief sub-layers 120-1, 120-2, and 120-3. Each of these sub-layers is formed by a thin film deposition of an aluminum oxide layer followed by an annealing process to reduce the stress between the sensing RTD elements 110 and the protective layer 120 and between the sub-layers. The details of the manufacturing processes will be further discussed below. The stress-relief protective layer 120 is then covered and protected by a glass passivation layer 130. The thin film sensing elements 110 are connected to a pair of bonding pads 135 composed of gold and platinum. The bonding pads 135 are also protected by a passivation layer 140. A pair of thick film printing pads in electric contact with the bonding pads 135 is printed onto a temperature probe for connection to a device, e.g., a cooking oven or an exhaust pipe extended from an automobile engine, for performing a temperature measurement.

A special structural feature of this RTD chip 100 is a plurality of trimming trenches 150 opened in the stress-relief protective layer 120. The trimming trenches are opened for the purpose of trimming the resistive temperature sensing elements 110 for adjusting the resistance of the RTD chip 100 after the protective stress-relief layer 120, including the sub-layers 120-1 to 120-3, is formed. The reason for resistor trimming after the completion of multiple deposition multiple-annealing process is to eliminate the stress-induced variations of the resistance-temperature coefficients. By first applying the anneal process for relieving the stress between the sensing element 110 and the protective layer 120, stable resistance-temperature coefficient may be maintained in subsequent temperature cycles. During the resistor trimming operations, the protective layer 120 is also removed and trimming trenches 150 are formed. The trimming trenches are then filled up with the passivation layer.

Figure 2B:
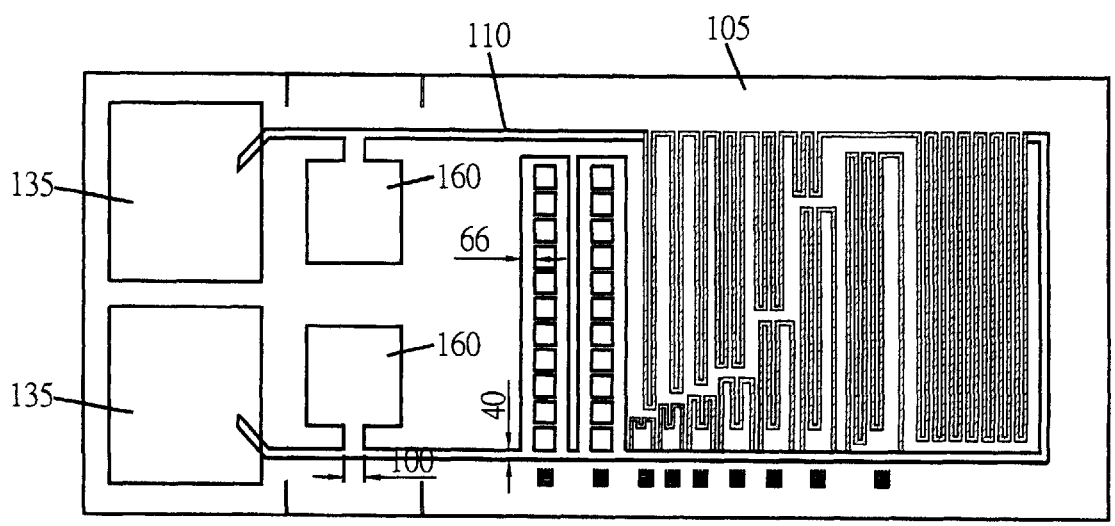

Please refer to FIG. 2B for an additional structural feature of the RTD chip 100. On the top view of the RTD chip 100, a pair of reference pads 160 is added because of the special sequence of resistor trimming process. The reference pads 160 are employed as temporary pads for measuring the resistance. The reference pads 160 are disconnected from the sensing resistive elements by cutting off the interconnecting lines after the trimming process is completed.

Figure 3A:
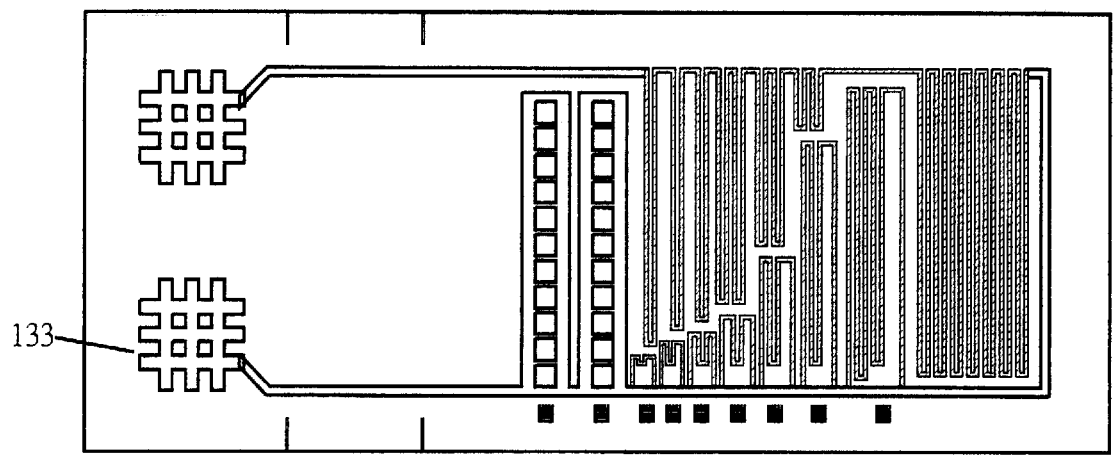
FIGS. 3A to 3C are top views of a of the high temperature RTD chip of this invention showing the processes to form the stable and reliable bonding pads by first laser-scribing or dicing the top surface of the substrate.
Figure 3B:
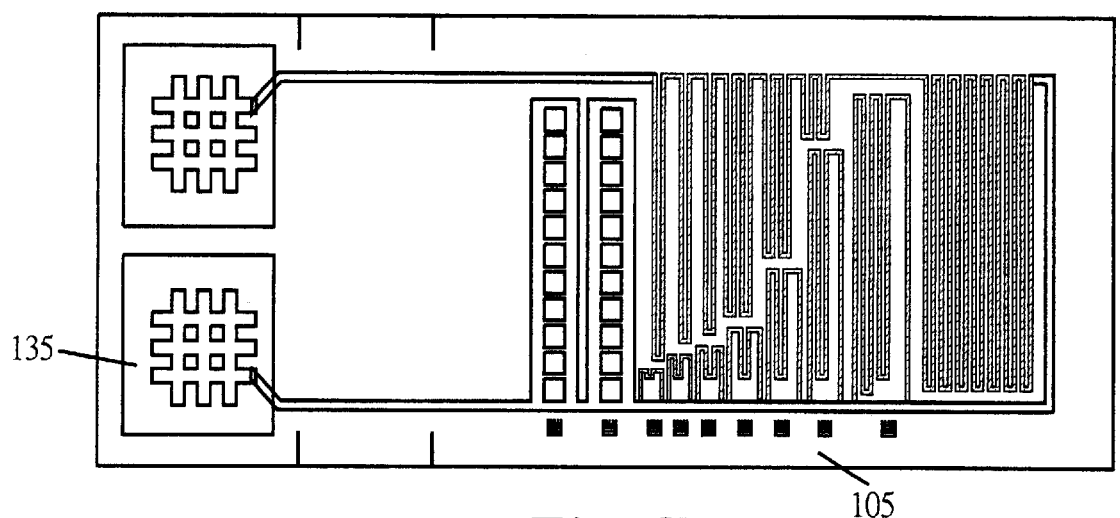
Figure 3C:
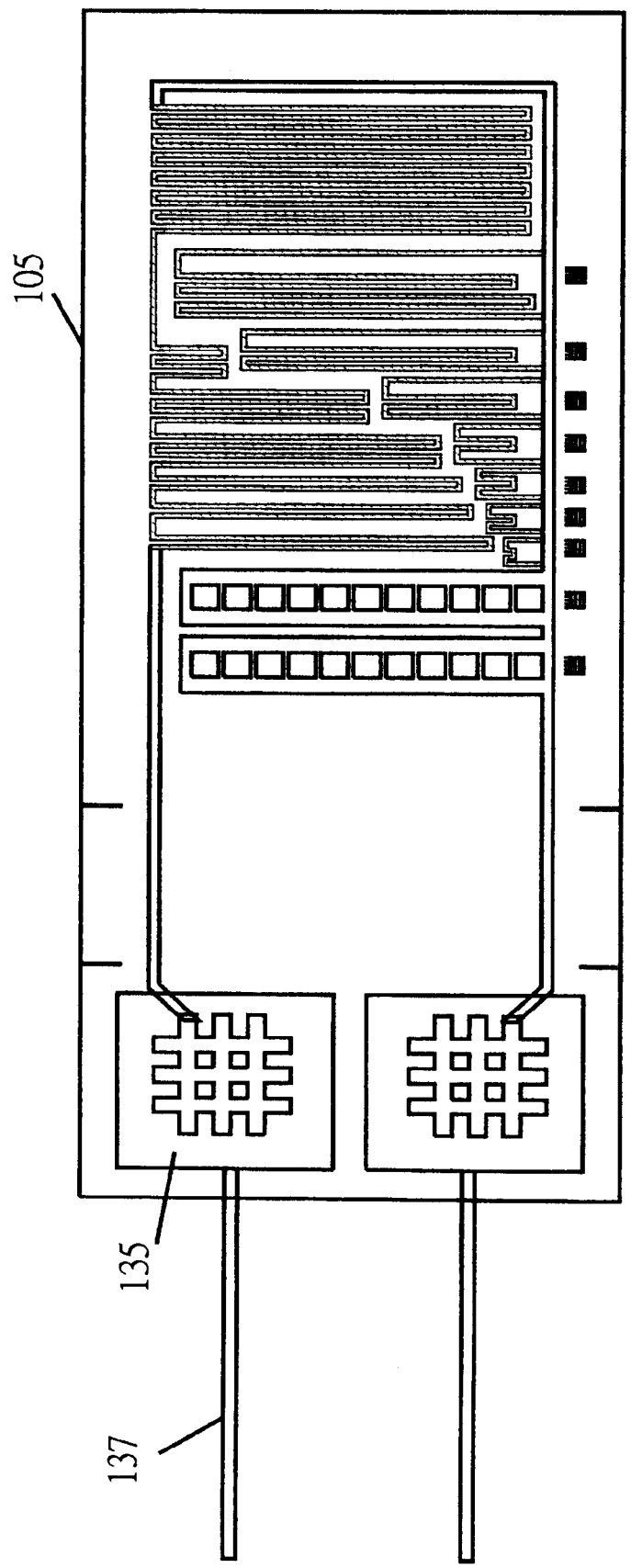

After the resistor trimming of the resistive sensing elements 110 covered by the multiple-deposition multiple-annealing protective layer 120 is completed, a pair of bonding pads 135 of the RTD chip 100 is formed on the top surface of the aluminum substrate 105. Referring now to FIG. 3A, the areas designated for the bonding pads on the top surface of the aluminum substrate are first laser-scribed or diced to create the rough surface area 133. The roughened surface areas 133 are prepared for thick film printing to generate a thick film bonding pad that could sustain over one thousand gram per square meter of pulling force. By first preparing the bonding pad areas 133 as roughened surface areas, interlocking bonding is generated between the bonding pads formed with thick film printing of gold or platinum and the aluminum oxide substrate 105. In FIG. 3B, a thick film printing is then carried out at 850 to 950° C. The thick film bonding pads are formed to overlap with the resistive thin film 110 for electrically connecting to the thin film resistor 110. The bonding pads 135 are formed only over the rough surface areas 133 to assure secure and stable bonding pads are formed without peeling off or structure damages due to high temperature cycles. Stable and reliable electrical connections are formed with strong bonding between the bonding pads 135 and the substrate 105. Referring to FIG. 3C, pure platinum leads 137 are formed as the chip lead for high temperature operation.

Therefore, the present invention provides a new layer structure and manufacture method for manufacturing a reliable high temperature TCR thin film sensor such that difficulties and limitations encountered in the prior art can be overcome. Specifically, this invention discloses a reliable and accurate thin film RTD chip sensor that can sustain long-term high temperature operations without degradation of structure integrity. The TCR film is deposited onto a pure aluminum oxide substrate. Then, the TCR film is protected by multiple-layer multiple annealing aluminum oxide layers. The residual mechanical stresses between the protective aluminum layers and the resistive sensing thin film that could be induced by temperature cycles are completely relieved by multiple annealing processes. Therefore, the TCR resistive can provide long term stable and precise temperature measurement with being unduly affected by the residual stresses induced by temperature cycles. The TCR trimming of the resistive sensing elements is performed after relief operation of the residual stress between the TCR thin film and the multiple-layer multiple-annealing protective layer is completed. Unlike the conventional RTD chip, in this invention, the resistive film trimming is performed with the resistive film covered under the multiple-layer multiple-annealing protective film. And for the purpose of resistive film trimming, temporary resistance measuring pads are formed only for trimming measurement.

A temperature sensor is disclosed in this invention. The temperature sensor includes an aluminum oxide substrate and a thin-film resistor having a specific temperature coefficient of resistance (TCR) disposed over the substrate. The temperature sensor further includes an aluminum oxide stress-relief layer covering the thin film resistor. The temperature sensor further includes a passivation layer covering the aluminum oxide stress-relief layer. The aluminum oxide stress-relief layer further having at least one resistor-trimming trench formed with a portion of the aluminum oxide stress-relief layer and a portion of the thin-film resistor removed from the trench and the resistor-trimming trench is filled with a material of the passivation layer. The temperature sensor further includes a set of reference pads for resistance-trimming measurement disconnected from the thin film resistor disposed on the substrate near the thin film resistor covered by the passivation layer. The temperature sensor further includes a set of sensor bonding pads disposed on the substrate electrically connected to the thin film resistor covered by the passivation layer. And, the temperature sensor further includes a set of platinum chip-leads bonded to the sensor bonding pads for temperature measurement connections.

This invention further discloses a temperature sensor that includes an aluminum oxide substrate and a thin-film resistor having a specific temperature coefficient of resistance (TCR) disposed over said substrate. The temperature sensor further includes an aluminum oxide stress-relief layer covering said thin film resistor wherein said aluminum oxide stress-relief layer comprising multiple-deposition multiple-annealing aluminum-oxide stress-relief layers.

This invention further discloses a method for manufacturing a resistive temperature detector (RTD) chip by forming a resistor with a patterned thin TCR-film on a top surface of the substrate. The method includes a step of a) forming a stress-relief layer constituting a multiple-annealing layer covering the TCR resistor formed with a stress-relief thin film deposition followed by at least a first and a second annealing of the stress-relief layer. In a preferred embodiment, the step a) of forming a stress-relief layer is a step of forming a multiple-layer multiple-annealing layer by depositing a first stress relief thin-film layer covering the TCR resistor followed by a first annealing and depositing a second stress-relief thin film layer covering the first stress-relief thin film layer followed by a second annealing. In a preferred embodiment, the method further includes a step b) forming a pair of resistor-trimming reference pads on top of said substrate and electrically connecting said resistor-trimming reference pads to said TCR resistor; and c) measuring a resistance of said TCR resistor using said pair of resistor-trimming reference pads while carrying out a resistor trimming by removing a portion of said stress-relief layer together with a portion of said TCR resistor thereunder for adjusting a resistance of said TCR resistor for achieving a predefined TCR sensor resistance.

A temperature sensor includes an aluminum oxide substrate and a thin-film resistor having a specific temperature coefficient of resistance (TCR) disposed over the substrate. The sensor further includes an aluminum oxide stress-relief layer covering the thin film resistor. The sensor further includes a pair of sensor bonding-pad placement sites disposed on top of the aluminum oxide substrate opposite the thin film resistor wherein each of the placement-sites comprising a laser-scribed roughened surface area on the substrate. In a preferred embodiment, the temperature further includes a pair of sensor bonding pads disposed on top of the pair of sensor bonding-pad placement sites on top of the substrate electrically connected to the thin film resistor. In another preferred embodiment, the temperature sensor further includes a passivation layer covering the aluminum oxide stress-relief layer and the pair of sensor bonding pads disposed on top of the pair of sensor bonding-pad placement sites. In another preferred embodiment, the temperature sensor further includes a set of platinum chip-leads bonded to the sensor bonding pads for temperature measurement connections.

This invention further discloses a method of manufacturing a temperature sensor chip provided with a thin-film resistor of a specific temperature coefficient of resistance (TCR) supported on a substrate. The method further comprising a step of a) forming a pair of sensor bonding-pad placement sites by roughening a pair surface areas as placement site areas on top of the substrate opposite the RTD thin film resistor on the substrate.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A temperature sensor comprising:
   an aluminum oxide substrate;
   a thin-film resistor having a specific temperature coefficient of resistance (TCR) disposed over said substrate;
   an aluminum oxide stress-relief layer covering said thin film resistor;
   a pair of sensor bonding-pad placement sites disposed on top of said aluminum oxide substrate opposite said thin film resistor wherein each of said placement sites comprising a laser-scribed roughened surface area on said substrate.

2. The temperature sensor of claim 1 further comprising:
   a pair of sensor bonding pads disposed on top of said pair of sensor bonding-pad placement sites on top of said substrate electrically connected to said thin film resistor.

3. The temperature sensor of claim 2 further comprising:
   a passivation layer covering said aluminum oxide stress-relief layer and said pair of sensor bonding pads disposed on top of said pair of sensor bonding-pad placement sites.

4. The temperature sensor of claim 2 further comprising:
   a set of platinum chip-leads bonded to said sensor bonding pads for temperature measurement connections.

5. The temperature sensor of claim 1 further comprising:
   a set of reference pads for resistance-trimming measurement disconnected from said thin film resistor disposed on said substrate near said thin film resistor.

6. The temperature sensor of claim 1 wherein:
   said aluminum oxide stress-relief layer further having at least one resistor-trimming trench formed with a portion of said aluminum oxide stress-relief layer and a portion of said thin-film resistor removed from said trench and said resistor-trimming trench is filled with a material of a passivation layer covering over said stress-relief layer.

7. A temperature sensor chip having a thin-film resistor with a specific temperature coefficient of resistance (TCR) supported on a substrate comprising:
   a pair of sensor bonding-pad placement sites disposed on top of said substrate opposite said RTD thin film resistor wherein each of said placement sites comprising a roughened surface area on said substrate.

8. The temperature sensor of claim 7 further comprising:
   a pair of sensor bonding pads disposed on top of said pair of sensor bonding-pad placement sites on top of said substrate electrically connected to said thin film resistor.

9. The temperature sensor of claim 8 further comprising:
   a multiple-deposition multiple-annealing aluminum oxide stress-relief layer covering said thin film resistor.

10. The temperature sensor of claim 9 further comprising:
    a passivation layer covering said multiple-deposition multiple-annealing aluminum oxide stress-relief layer and covering said pair of sensor bonding pads.

11. The temperature sensor of claim 10 wherein:
    said multiple-deposition multiple-annealing aluminum oxide stress-relief layer further having at least one resistor-trimming trench formed with a portion of said aluminum oxide stress-relief layer and a portion of said thin-film resistor removed from said resistor-trimming trench and said resistor-trimming trench is filled with a material of said passivation layer.

12. The temperature sensor of claim 10 wherein:
    said passivation layer comprising a silicon oxide layer.

13. The temperature sensor of claim 7 further comprising:
    a set of reference pads for trimming resistance measurement disconnected from said thin film resistor disposed on said substrate near said thin film resistor.

14. The temperature sensor of claim 8 further comprising:
    a set of platinum chip-leads bonded to said sensor bonding pads for temperature measurement.

* * * * *